(12) United States Patent
Noe

(10) Patent No.: US 10,798,914 B1
(45) Date of Patent: Oct. 13, 2020

(54) FEEDER BAG WITH TROUGH PORTION

(71) Applicant: Timothy B. Noe, Arlington, TX (US)

(72) Inventor: Timothy B. Noe, Arlington, TX (US)

( * ) Notice: Subject to any disclaimer, the term of this patent is extended or adjusted under 35 U.S.C. 154(b) by 396 days.

(21) Appl. No.: 15/824,740

(22) Filed: Nov. 28, 2017

Related U.S. Application Data

(60) Provisional application No. 62/426,996, filed on Nov. 28, 2016.

(51) Int. Cl.
*A01K 5/00* (2006.01)
*A01K 5/01* (2006.01)

(52) U.S. Cl.
CPC ............... *A01K 5/008* (2013.01); *A01K 5/01* (2013.01); *A01K 5/0107* (2013.01)

(58) Field of Classification Search
CPC ......... A01K 5/008; A01K 5/0107; A01K 5/01
See application file for complete search history.

(56) References Cited

U.S. PATENT DOCUMENTS

| | | | | |
|---|---|---|---|---|
| 185,238 A * | 12/1876 | Johnson | ............... | A01K 5/01 119/61.3 |
| 856,756 A * | 6/1907 | Avey | ............... | A01K 5/008 119/65 |
| 906,831 A * | 12/1908 | Shoemaker | ............... | A01K 5/008 119/65 |
| 908,518 A * | 1/1909 | Thiel | ............... | A01K 5/008 119/65 |
| 1,300,985 A * | 4/1919 | Mandelbaum | ............... | A01K 5/008 119/65 |
| 3,678,902 A * | 7/1972 | Ruth | ............... | A01K 5/0291 119/51.11 |
| 5,188,060 A * | 2/1993 | Johnson | ............... | A01K 5/01 119/51.03 |
| 5,375,559 A * | 12/1994 | Baadsgaard | ............... | A01K 5/01 119/58 |
| 5,479,881 A | 1/1996 | Lush et al. | | |
| 5,909,717 A * | 6/1999 | Randall | ............... | A01K 5/01 119/58 |
| 2012/0266824 A1 | 10/2012 | Trauttmansdorf et al. | | |
| 2013/0112148 A1 * | 5/2013 | Warren | ............... | A01K 5/008 119/65 |
| 2015/0128867 A1 * | 5/2015 | Keith | ............... | A01K 5/01 119/65 |

FOREIGN PATENT DOCUMENTS

| | | | | |
|---|---|---|---|---|
| DE | 460502 C | * | 5/1928 | ............. A01K 5/008 |
| DE | 202016002923 U1 | * | 6/2016 | ............. A01K 5/008 |

* cited by examiner

*Primary Examiner* — Jessica B Wong
(74) *Attorney, Agent, or Firm* — Foley & Lardner LLP

(57) ABSTRACT

A feeder bag includes a bag portion formed of a front panel and a rear panel. A lower flap is pivotally coupled to the front panel at a lower flap junction and is disposed proximate a bottom end of the bag portion. An upper flap is pivotally coupled to the front panel at an upper flap junction and is disposed above the lower flap. The upper and lower flaps include slots. A first side brace defines a first upper tab and a first lower tab, and a second side brace defines a second upper tab and a second lower tab. The tabs of the braces are received in the slots of the flaps to create a trough portion. The front panel of the bag portion defines at least one through hole disposed between the upper flap junction and the lower flap junction.

20 Claims, 5 Drawing Sheets

FEEDER BAG WITH TROUGH PORTION

CROSS REFERENCE TO RELATED APPLICATIONS

This application is a United States Non-Provisional Patent Application which claims the benefit of priority from U.S. Provisional Patent Application No. 62/426,996, filed Nov. 28, 2016, and the disclosure of which is incorporated herein by reference.

TECHNICAL FIELD

This disclosure relates to feeder bags for holding feed for animals, and in particular, to an apparatus and system for conveniently holding and dispensing feed for wild animals, such as, but not limited to, deer and elk.

BACKGROUND OF THE DISCLOSURE

Hunters use feed dispensers to attract wild animals to a particular area and to provide necessary nutrients to those animals. In most cases, the hunter places the feed in a large hopper associated with a feed dispensing mechanism. The feed dispensing mechanism and hopper are often supported by a tripod or other leg arrangement so that the feed is accessible to a particular group of animals, such as deer and elk, and is also supported away from the ground. Unfortunately, these types of feed dispensing mechanisms and hoppers are often expensive. In addition, these types of feeders are often difficult to transport to the location of the animals, which is typically remote from roads and other easily traveled vias.

SUMMARY

A feeder bag includes a bag portion formed of a front panel and a rear panel. A lower flap is pivotally coupled to the front panel at a lower flap junction and is disposed proximate a bottom end of the bag portion. An upper flap is pivotally coupled to the front panel at an upper flap junction and is disposed above the lower flap. The upper and lower flaps include slots. A first side brace defines a first upper tab and a first lower tab, and a second side brace defines a second upper tab and a second lower tab. The tabs of the braces are received in the slots of the flaps to create a trough portion. The front panel of the bag portion defines at least one through hole disposed between the upper flap junction and the lower flap junction.

According to an alternate embodiment, portions of the front panel disposed between the upper flap junction and the lower flap junction include perforated perimeters and removing the portions at the perforations allows feed to flow from the bag portion and accumulate in the trough portion.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
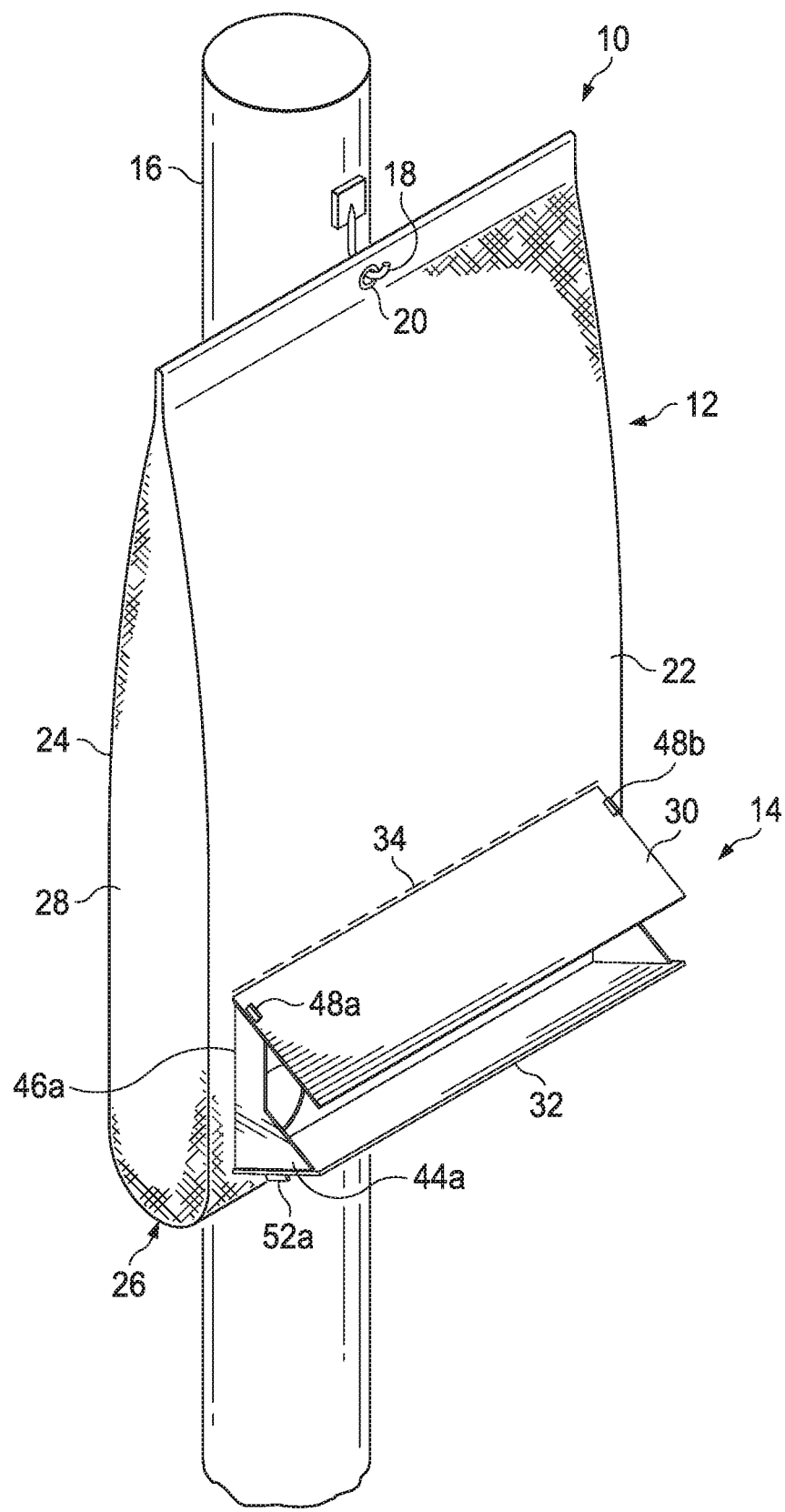
FIG. 1 is an environmental, isometric view of a feeder bag with integral trough in accordance with this disclosure.

Reference is made to FIG. 1, which is an isometric, environmental view of a feeder bag with integral trough 10 according to the teachings of the present disclosure. The feeder bag 10 includes a bag portion 12 and a trough portion 14 disposed proximate a bottom end of the bag portion 12. The feeder bag 10 may be hung from a T-post 16 such that gravity causes the feed to flow into and collect in the trough portion 14. An end of the T-post 16 is penetrated into the ground in order to hold the T-post 16 in a generally vertical and upright orientation. The T-post 16 may include a plurality of hooks 18 spaced apart along its length. According to one embodiment, the bag portion 12 includes a through hole 20 disposed proximate a top end of the bag portion 12 that can receive one of the hooks 18 of the T-post 16 in order to suspend the feeder bag 10 above the ground. A grommet may be fitted in the through hole to prevent the bag portion from tearing.

According to one embodiment, the hook 18 is selected such that the trough portion 14 of the feeder bag 10 is at a level of a snout of a target animal, such as a deer or an elk. According to an alternate embodiment, the feeder bag 10 may be tethered to a trunk of a tree or otherwise secured to a sturdy object or structure capable of supporting the weight of the full feeder bag 10. Gravity causes the trough portion 14 to continuously fill with feed until approximately all of the feed has been consumed and the feeder bag 10 may be either refilled with more feed or discarded. The bag 10 may hold 20, 30, 40, 50 or more pounds of animal feed.

The bag portion 12 may be made of any suitable material, such as paper, canvas, burlap, a polymeric material, and the like. According to one embodiment, the bag portion 12 may be formed of a polymeric material, such as polyethylene. Such bag portion 12 may be referred to as a poly bag. The bag portion 12 may include artwork such as a logo and may have a camouflage design with colors that are selected to blend into a wooded environment. The bag portion 12 includes a front panel 22, a rear panel 24, and optionally a bottom panel 26. Side panels or gussets 28 flank the front panel 22 and the rear panel 24. The panels may be joined to each other using any suitable joining technique for the material of the panels. For example, the panels may be sewn together or joined together with a suitable adhesive. According to an alternate embodiment, each of the panels may be initially formed as a single, unitary body, and then subsequently formed in the shape of the bag portion 12. The bag portion 12 may be filled with feed through an opening at the top of the bag portion 12 created between the front panel 22 and the rear panel 24. Once filled, the front panel 22 may be sealed or otherwise secured to the rear panel using any suitable sealing technique, such as adhesive bonding and/or sewing. The bag portion 12 may be any suitable size, for example the bag portion 12 may be sized to hold a volume of 20, 30, 40, 50 pounds or more of feed.

Figure 2:
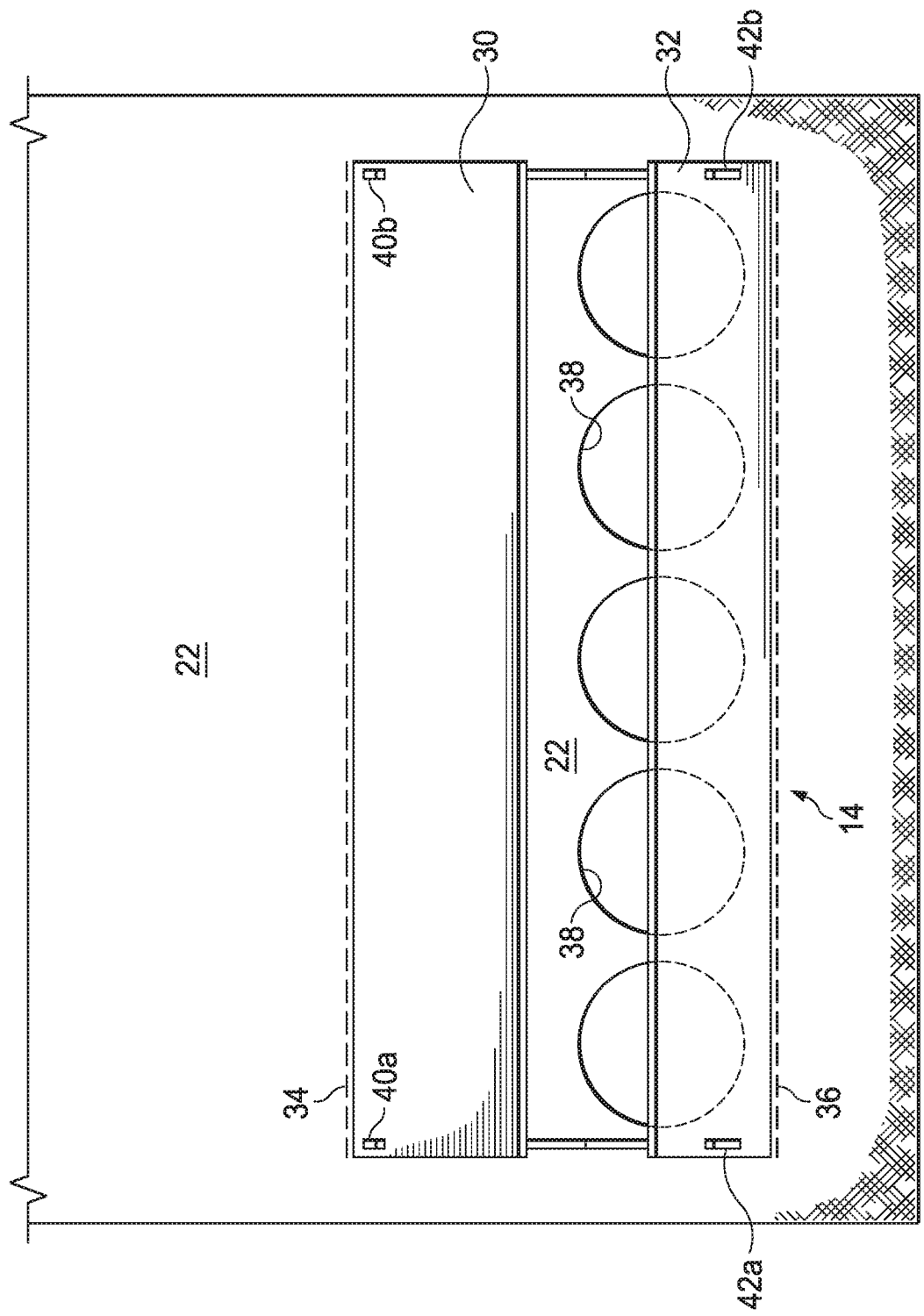
FIG. 2 is a front, detail view of a trough portion of the feeder bag with integral trough of FIG. 1.
Figure 3:
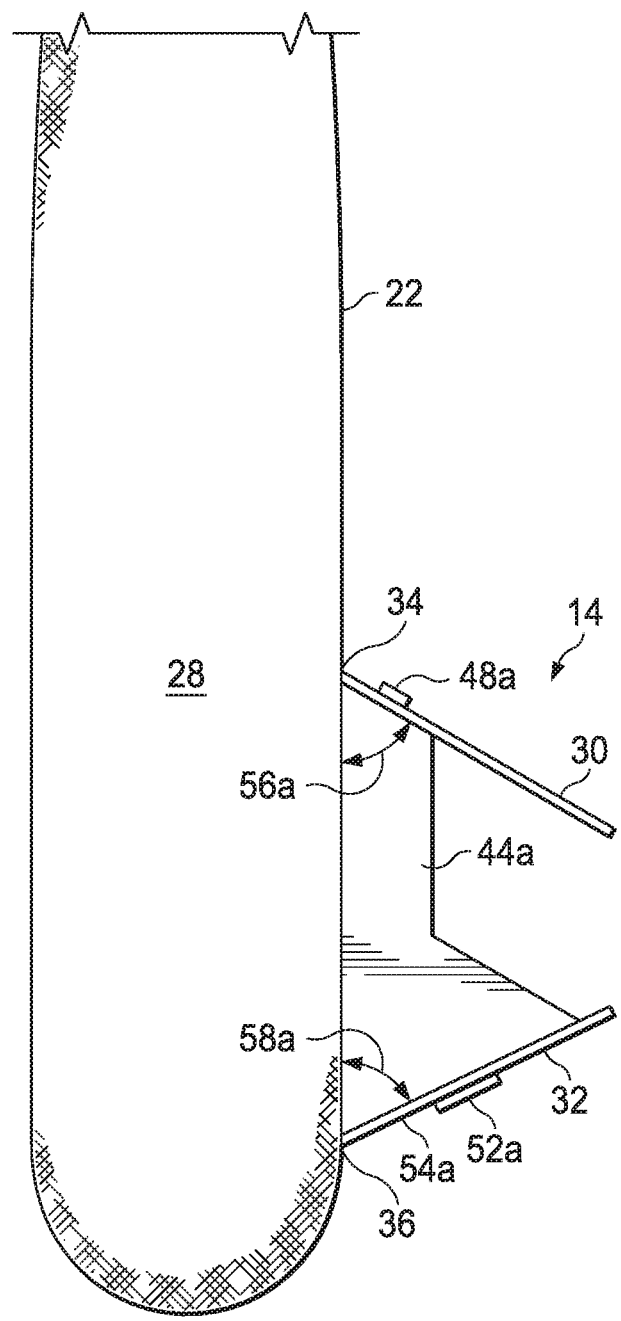
FIG. 3 is a side, detail view of the trough portion of the feeder bag with integral trough of FIGS. 1 and 2.

Reference is made to FIGS. 2 and 3, which are front and side detail views respectively of the trough portion 14 of the feeder bag with integrated trough 10. The trough portion 14 includes an upper flap 30 and a lower flap 32. When in a deployed position, the lower flap 32 serves as a surface for the feed to collect on and be accessed by the target animal. The upper flap 30 serves as a roof to protect the accumulated feed from rain.

Each of the lower flap 32 and the upper flap 30 are pivotally attached to the bag portion 12 such that they may be moved from the non-deployed, closed configuration to the deployed configuration. Each of the lower flap 32 and the upper flap 30 may be attached to the bag portion using any suitable attachment method. For example, the upper flap 30 and the lower flap 32 may be sewn to the bag portion 12. Alternatively, the lower flap 32 and the upper flap 30 may be affixed to the bag portion 12 by an adhesive. Each of the upper flap 30 and lower flap 32 may be a generally thin walled molded polymeric part. According to one embodiment, the upper flap 30 and the lower flap 32 are semi-rigid. For example, the upper flap 30 and the lower flap 32 may be formed from an extruded sheet of polypropylene. According to one embodiment, the sheet includes a pair of walls separated by corrugations. Alternatively, the sheet may be a single wall folded into corrugations. The upper flap 30 and the lower flap 32 each may have a thickness of approximately ⅛ inch.

According to one embodiment, the upper flap 30 is sewn or otherwise pivotally attached to the front panel 22 at an upper flap junction 34, and the lower flap 32 is sewn or otherwise attached to the front panel 22 at a lower flap junction 36. The upper flap junction 34 is spaced apart from the lower flap junction 36 a range of 4-10 inches, for example six inches. A plurality of through holes 38 are formed in the front panel 22 and are disposed between the upper flap junction 34 and the lower flap junction 36. The through holes 38 may be circular, oval, rectangular, or any suitable shape. The feeder bag 10 may include 5-6 through holes within the trough portion 14. The through holes may have a diameter of 2-4 inches, for example 2.5 inches. Alternatively, a single through hole 38 is formed in the front panel 22.

According to an alternate embodiment, the through holes 38 may be initially covered by a portion of the front panel 22 that has a perforated perimeter. In this embodiment, the perforations allow the integral feeder bag and trough 10 to be filled by a manufacturer with the through holes 38 sealed by the perforated portions, and then the consumer may deploy the trough portion 14, as explained in further detail below. After deploying the trough portion 14, the perforated portions of the front panel 22 may be removed at the perforations and the feed is allowed to flow into and collect in the trough portion 14.

In both the perforated and the through hole embodiments, in a non-deployed or closed configuration, the lower flap 32 is folded toward the front panel 22 of the bag portion 12. A distal end of the lower flap 32 is sewn, adhered, or otherwise secured to the front panel 22 between the upper panel junction 34 and the lower panel junction 36. A distal end of the upper flap 30 is folded over the lower flap 32 and sewn, adhered, or otherwise secured to the lower flap 32. The feed is fully contained in the bag portion 12 until the consumer separates the distal end of the upper flap 30 from the lower flap 32, and then separates the distal end of the lower flap 32 from the front panel 24 in connection with deployment of the trough portion 14.

The upper flap 30 includes a right slot 40a and a left slot 40b. The lower flap 32 also includes a right slot 42a and a left slot 42b. Each of the four slots are configured to receive a tab portion of a side brace. The trough portion 14 includes a right side brace 44a that is pivotally attached to the front panel 22 of the bag portion 12, for example by sewing. A junction edge 46a of the right side brace 44a is sewn or otherwise pivotally secured to the front panel 22 of the bag portion 12. A left brace 44b includes a junction edge 46b that is sewn or otherwise pivotally attached to the front panel 22 of the bag portion 12 opposite the right side brace 44a.

Each of the right brace 44a and the left brace 44b are formed of the same semi-rigid material as the upper flap 30 and the lower flap 32, for example a corrugated polymeric material, such as corrugated polypropylene. The semi-rigid material is cut to the appropriate shape and to include an upper tab 48a that extends from an upper edge 50a of the right side brace 44a, and a lower tab 52a that extends from a lower edge 54a of the right side brace 44a. Similarly, an upper tab 48b extends from an upper edge 50b of the left side brace 44b and a lower tab 52b extends from a lower edge 54b of the lift side brace 44b.

Each of the tab portions 48a, 48b are received in a corresponding slot 40a, 40b of the upper flap 30, and each of the tab portions 52a, 52b are received in a corresponding slot 42a, 42b of the lower flap 32. The semi-rigidity of the left and right braces 44a, 44b and an angle 58a, 58b of the lower edges 54a, 54b maintain the lower flap 32 in position to receive the feed and allow it to accumulate. An angle 56a, 56b of the upper edge 50a, 50b and the semi-rigidity of the left and right braces 44a, 44b simultaneously maintain the upper flap 30 in position to act as a roof over the accumulated feed such that the accumulated feed is at least partially protected from rain. The semi-rigidity of the upper panel 30 and the lower panel 32 maintain the side braces 44a, 44b in their deployed, open configurations and thereby form the deployed trough portion 14.

According to one embodiment, the left and right braces maintain the lower flap at approximately an angle in a range of 50-90 degrees, for example 60 degrees with respect to the front panel 22 of the bag. This angle may be determined by the angle 58a, 58b which is also in the range of 50-90 degrees, for example 60 degrees. The left and right braces 44a, 44b maintain the upper flap 30 at an angle of 50-90 degrees, for example 120 degrees with respect to the front panel 22 of the bag portion 12. This angle may be determined by the angle 56a, 56b, which is also in the range of 50-90 degrees. According to one embodiment, the distal ends of the upper flap 30 and the lower flap 42 are vertically separated a distance of 3-5 inches. This distance allows a snout of an animal to be received between the upper flap 30 and the lower flap 32, such that the animal can access and consume the feed that has accumulated in the trough portion 14.

The lower tabs 52a, 52b may have an L-shape and include a locking portion that contacts an underside of the lower flap 32 to restrict the lower flap 32 from pivoting downward under the weight of the accumulated feed.

Figure 4:
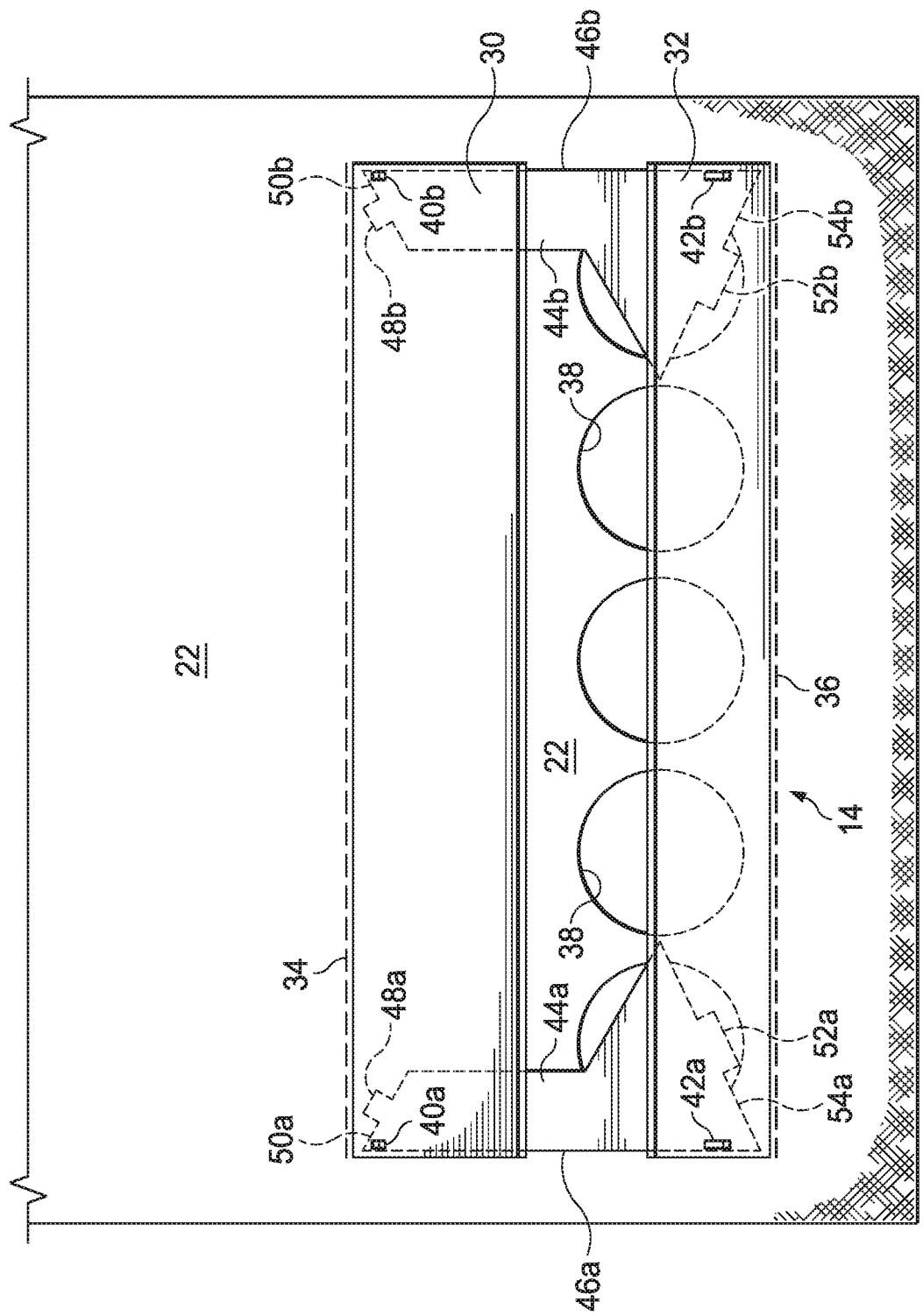
FIG. 4 is a front, detail view of the trough portion of the feeder bag with integral trough in a partially closed configuration.

FIG. 4 illustrates the trough portion 14 of the feeder bag with integral trough 10 in a partially closed position. The side braces 44a, 44b are folded toward the front panel 22, and the upper flap 30 and the lower flap 32 are in a partially open configuration.

Figure 5:
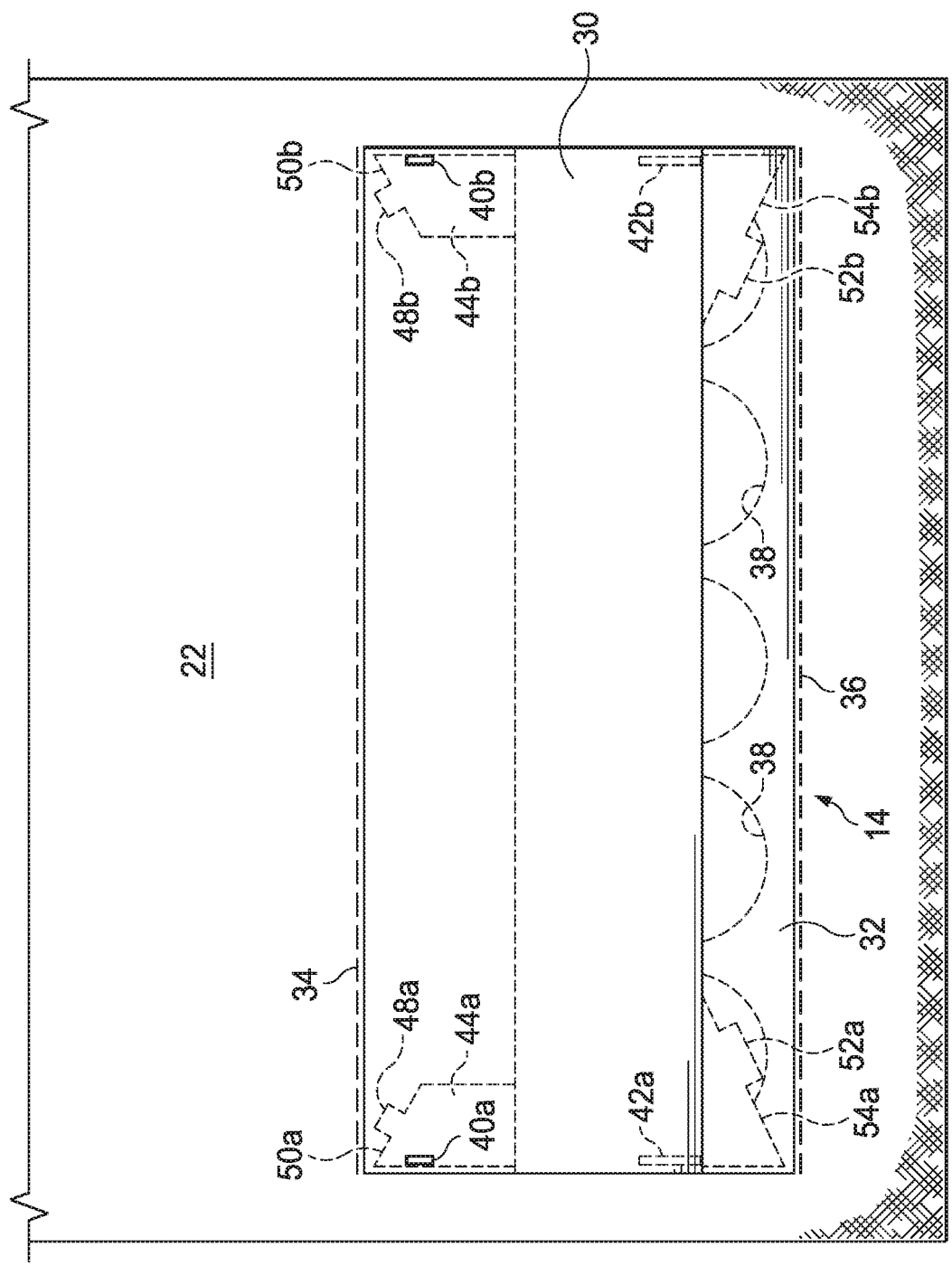
FIG. 5 is a front, detail view of the trough portion of the feeder bag with integral trough in a fully closed configuration.

FIG. 5 illustrates the trough portion 14 of the feeder bag with integral trough 10 in a fully closed position. The side braces 44a, 44b are folded toward the front panel 22, and the lower flap 32 is folded toward the front panel 22, and the upper flap 30 is folded over and secured to the lower flap 32.

The foregoing describes only some embodiments of the invention(s), and alterations, modifications, additions and/or changes can be made thereto without departing from the scope and spirit of the disclosed embodiments, the embodiments being illustrative and not restrictive. In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A feeder bag, comprising:
    a bag portion including a front panel and a rear panel and configured to contain a quantity of feed;
    a lower flap pivotally coupled to the front panel at a lower flap junction and disposed proximate a bottom end of the bag portion, the lower flap defining a first lower slot and a second lower slot;
    an upper flap pivotally coupled to the front panel at an upper flap junction and disposed above the lower flap, the upper flap defining a first upper slot and a second upper slot;
    a first side brace defining a first upper tab and a first lower tab, the first lower slot configured to receive the first lower tab and the first upper slot configured to receive the first upper tab;
    a second side brace defining a second upper tab and a second lower tab, the second lower slot configured to receive the second lower tab and the second upper slot configured to receive the second upper tab; and
    wherein the front panel of the bag portion defines at least one through hole disposed between the upper flap junction and the lower flap junction.

2. The feeder bag of claim 1 wherein the first side brace is pivotally coupled to the front panel and the second side brace is pivotally coupled to the front panel.

3. The feeder bag of claim 1 wherein the upper flap is sewn to the front panel and the lower flap is sewn to the front panel.

4. The feeder bag of claim 3 wherein the first side brace is sewn to the front panel and the second side brace is sewn to the front panel.

5. The feeder bag of claim 1 wherein the lower flap forms an angle between 5-90 degrees with respect to the front panel when the lower flap is in a deployed position.

6. The feeder bag of claim 5 wherein the angle is 75 degrees.

7. The feeder bag of claim 1 wherein the first side brace includes a first junction edge and a first lower edge, the first lower tab extending from the first lower edge, the first lower edge forming a lower angle of 50-90 degrees with the first junction edge.

8. The feeder bag of claim 7 wherein the lower angle is 75 degrees.

9. The feeder bag of claim 7 wherein the first side brace includes a first upper edge, the first upper tab extending from the first upper edge, the first upper edge forming an upper angle of 50-90 degrees with the first junction edge.

10. The feeder bag of claim 9 wherein the upper angle is 60 degrees.

11. The feeder bag of claim 1 wherein each of the upper flap, the lower flap, the first side brace, and the second side brace is formed of a corrugated polymeric material.

12. The feeder bag of claim 11 wherein the polymeric material is a polypropylene.

13. The feeder bag of claim 1 wherein the bag portion is formed of a polymeric material.

14. The feeder bag of claim 13 wherein the polymeric material is a polyethylene.

15. A feeder bag, comprising:
    a bag portion including a front panel and a rear panel and configured to contain a quantity of feed;
    a lower flap pivotally coupled to the front panel at a lower flap junction and disposed proximate a bottom end of the bag portion, the lower flap defining a first lower slot and a second lower slot;
    an upper flap pivotally coupled to the front panel at an upper flap junction and disposed above the lower flap, the upper flap defining a first upper slot and a second upper slot;
    a first side brace defining a first upper tab and a first lower tab, the first lower slot configured to receive the first lower tab and the first upper slot configured to receive the first upper tab;
    a second side brace defining a second upper tab and a second lower tab, the second lower slot configured to receive the second lower tab and the second upper slot configured to receive the second upper tab; and
    wherein a portion of the front panel has a perimeter perforation disposed between the upper flap junction and the lower flap junction, wherein removing the portion of the front panel allows feed to flow and collect on the lower flap.

16. The feeder bag of claim 15 wherein the first and second side braces are pivotally coupled to the front panel.

17. The feeder bag of claim 15 wherein each of the upper flap, the lower flap, the first side brace, and the second side brace is formed of a corrugated polymeric material.

18. The feeder bag of claim 17 wherein the polymeric material is a polypropylene.

19. A feeder bag, comprising:
    a bag portion including a front panel and a rear panel and configured to contain a quantity of feed;
    a lower flap sewn to the front panel at a lower flap junction and extending therefrom at an angle of 50-90 degrees, the lower flap disposed proximate a bottom end of the bag portion and defining a first lower slot and a second lower slot;

an upper flap sewn to the front panel at an upper flap junction and disposed above the lower flap, the upper flap defining a first upper slot and a second upper slot;

a first side brace sewn to the front panel and defining a first upper tab and a first lower tab, the first lower slot configured to receive the first lower tab and the first upper slot configured to receive the first upper tab;

a second side brace sewn to the front panel and defining a second upper tab and a second lower tab, the second lower slot configured to receive the second lower tab and the second upper slot configured to receive the second upper tab; and wherein the front panel of the bag portion defines at least one through hole disposed between the upper flap junction and the lower flap junction.

20. The feeder bag of claim 19 wherein the angle is 75 degrees.

\* \* \* \* \*